United States Patent [19]
Bruch et al.

[11] Patent Number: 5,845,027
[45] Date of Patent: Dec. 1, 1998

[54] DISCONNECTABLE PLUG

[75] Inventors: Helmut Bruch; Christian Sieber; Eugen Faist, all of Berlin, Germany

[73] Assignee: Siemens Aktiengesellschaft, Munich, Germany

[21] Appl. No.: 760,659

[22] Filed: Dec. 9, 1996

[30] Foreign Application Priority Data

Dec. 8, 1995 [DE] Germany ............... 195 47 525.9

[51] Int. Cl.⁶ .................................................. G02B 6/36
[52] U.S. Cl. .......................... 385/59; 385/78; 385/88; 385/89; 385/92
[58] Field of Search .......................... 385/56–60, 70, 385/71, 72, 73, 76, 77, 78, 89, 90, 91, 92

[56] References Cited

U.S. PATENT DOCUMENTS

| | | | |
|---|---|---|---|
| 4,167,303 | 9/1979 | Bowen et al. | 350/96.21 |
| 4,818,058 | 4/1989 | Bonani | 350/96.2 |
| 5,082,344 | 1/1992 | Mulholland et al. | 385/60 |
| 5,428,702 | 6/1995 | Schoss | 385/59 |
| 5,600,747 | 2/1997 | Yamakawa et al. | 385/59 |
| 5,608,830 | 3/1997 | Beleniy et al. | 385/78 |
| 5,689,609 | 11/1997 | Tonejc | 385/147 |

FOREIGN PATENT DOCUMENTS 0 374 136 A2   6/1990   European Pat. Off. .

*Primary Examiner*—Hung N. Ngo
*Attorney, Agent, or Firm*—Herbert L. Lerner; Laurence A. Greenberg

[57] ABSTRACT

In fiber-optical plug connections or guard plugs for electrooptical modules, detent arms are used to lock the connection. When such connections are undone, the detent arms are pressed out of their abutments and in the process are exposed to a severe mechanical stress, which can cause material fatigue. A disconnectable plug includes two spaced-apart outer walls that can be spread apart from one another. Through the use of a partition, the two outer walls are resiliently supported against one another in their middle region. In an insertion position, detent arms of plug partners are lockingly supported by the outer walls that have detent surfaces. In an unlocking position, the outer walls release the detent arms. The detent arms are stressed only by tension but not by flexion. Conversely, the partition receives the entire bending stress upon spreading. The disconnectable plug is especially suitable for guard plugs and connections in electrooptical modules.

9 Claims, 3 Drawing Sheets

DISCONNECTABLE PLUG

BACKGROUND OF THE INVENTION

FIELD OF THE INVENTION

The invention relates to a disconnectable plug with two spaced-apart outer walls aligned approximately parallel to one another, which define a receptacle chamber for a plug element and have a front insertion region with detent surfaces for locking corresponding detent arms of a plug partner.

Secure plug connections, which enable coupling of fiber-optical wave guides as needed, should be constructed simply and should exhibit good coupling action. In addition, the connection should be capable of withstanding heavy stress. Plug connections are used not only to couple fiber-optical wave guides but also to guard electrooptical modules and other electrooptical components.

A duplex plug known from Published European Patent Application 0 374 136 A2 and having fiber-optical wave guides, is formed of two housing halves that fit together. Laterally of the housing halves, detent arms pointing in opposite directions from the fiber-optical wave guide ends are attached with detent hooks pointing toward the outside. When the plug is joined together with a connecting coupling, the detent arms inside the housing of the connecting coupling are pressed against the plug, but they protrude again in the terminal position. In the process, because of the abutment-type bracing of the detent hooks, the plug is locked in internal indentations in the housing of the connecting coupling. For unlocking, the detent arms are pressed against the plug housing, which unlatches the detent hooks.

The same reference describes a further locking mechanism. Locking latches pointing toward the plug housing are provided on detent arms. The detent arms are resiliently joined in their middle portion to the plug housing. Pressure against the rear portion of the detent arms lifts the front portion having the locking latch and releases an abutment on the outside of a connecting coupling. That undoes the locking. In both above-described devices, the detent arms are severely stressed and can easily break. The structures of the plug are complicated and require high production effort and expense.

A plug of the type referred to at the outset is known from U.S. Pat. No. 5,082,344. A coupling for connecting two simplex plugs has two SC slots, pointing in opposite directions and beginning at two central base plates, for coupling to fiber-optical wave guides. In each slot, a receptacle adjoins the base plates, and detent arms adjoin the bush laterally thereof. The detent arms are latched into recesses in the plug housing for locking a plug to the coupling. For unlocking, the plug is provided with a movably attached grip portion, which can be moved under the detent arms by axial displacement and presses the detent arms out of the recesses. In that plug connection, the detent arms are bent severely during both locking and unlocking, and an additional unlocking mechanism is necessary.

In all of the locking techniques described above, the detent arms are severely stressed. In one connection type, the detent arms located in coupling slots are pressed out of the abutments by suitable unlocking mechanisms. In the other connection type, the plug connection is unlocked by pressure on detent arms, attached to the plug and having detent hooks. In both cases, the detent arms are stressed by tension and flexion. Cleaning media, which are used in the production process and in the maintenance of plug connections and modules, often impair the mechanical stability of detent arms. The bending strains that typically occur are a particular cause of material breakage.

SUMMARY OF THE INVENTION

It is accordingly an object of the invention to provide a disconnectable plug, which overcomes the hereinafore-mentioned disadvantages of the heretofore-known devices of this general type, which is simple and which has a functionally reliable locking and unlocking mechanism that puts the least possible strain on detent arms.

With the foregoing and other objects in view there is provided, in accordance with the invention, a disconnectable plug, comprising two spaced-apart and approximately mutually parallel aligned outer walls; the outer walls defining a receptacle chamber for a plug element; the outer walls having a front insertion region with detent surfaces for locking corresponding detent arms of a counterpart plug partner having an interaction region; the outer walls having a middle region resiliently joining the outer walls together for interacting the detent surfaces with the detent arms of the plug partner in an inserted, locked state of the plug; and the insertion regions resiliently spreading apart for transferring the plug into an unlocking position with the detent surfaces removed from the interaction region of the detent arms of the plug partner.

The disconnectable plug according to the invention includes two spaced-apart outer walls aligned approximately parallel to one another. They define a receiving chamber for a plug partner. The front insertion region of the outer walls has detent surfaces for locking corresponding detent arms of one plug partner. The outer walls are resiliently joined together in their middle region. As a result, two functional positions of the plug are attainable. In an insertion position, which is equivalent to an inserted, locked state of the plug, the detent arms of the plug partners interact with the detent surfaces of the plug. Conversely, it is possible to remove the detent surfaces from the interaction region of the detent arms, in an unlocking position. The plug is transferred to the insertion position by resilient spreading apart of the insertion regions.

The resilient connection of the two outer walls guarantees that the plug in the inserted state will automatically assume the insertion position. This is attained through the use of the resilient return of the spread-apart insertion regions of the outer walls to the position in which they are approximately parallel to one another. In the parallel position or insertion position, the detent arms of the plug partners interact in such a way with the detent surfaces of the housing walls that a solid, durable and secure connection of the two plug partners is established.

Thus according to the invention, the outer walls take on the fixation function. No additional fixation devices, such as detent arms on the plug, are necessary. It is equally possible to dispense with an independent, expensive unlocking mechanism. As a result of the shaping of the spreadable outer walls according to the invention, a partially open housing and therefore the protection of connecting components of the plug is achieved in an especially advantageous way, and at the same time the connection and unlocking are made possible without an additional unlocking mechanism or additional strain on detent arms of the plug partners.

In accordance with another feature of the invention, the detent surfaces of each outer wall cooperate with both detent arms of the plug partners. Since each detent arm is received on two sides by the outer walls, a 4-surface bearing of the plug is produced, and the four interaction surfaces are maximally spaced apart from the perspective axis of the plug. In the cross-sectional profile of the plug, the interaction surfaces are each located in the outer corners. As a result, outstanding stability of the plug connection is achieved.

The resilient connection of the two outer walls is advantageously constructed in such a way that they have a high load-bearing capacity. In accordance with a further feature of the invention, this is attained especially simply and advantageously through the use of a partition that occupies the full width of the outer walls. The partition joins the outer walls together in their middle region. The suitably constructed partition guarantees a high spring force for locking the plug and an adequate load-bearing capacity even for severe stresses.

As a result of the plug according to the invention, the detent arms located on the plug partners are stressed only by tension but not by flexion.

In contrast to this, the partition is primarily stressed by flexion. Since the partition is extended over the full width of the outer walls, the total load on the partition from flexion is slight. Bending moments that might act on the outer walls can be absorbed by material profiles, such as additional longitudinal ribs or side surfaces. The plug according to the invention therefore makes it possible, in an especially advantageous way, to divide up the load among the cooperating locking component groups (detent arms, outer walls, partition) and thus to lend an optimal embodiment to each component group.

In accordance with an added feature of the invention, the plug is constructed in one piece of a solid plastic or hard plastic. The partition that joins the two outer walls together assures a high spring force and a high load-bearing capacity. The cross-sectional profile of the partition or connecting wall is chosen suitably for absorbing the bending forces.

In accordance with an additional feature of the invention, the connecting wall may advantageously also act as a carrier of fiber-optical plug pins or protective seals for fiber-optical wave guide receiving bushes. The aforementioned plug elements are then protectively surrounded by both outer walls. In the case of fiber-optical plug pins, the connecting wall can advantageously also receive devices for tension relief of fiber-optical wave guide cables.

In accordance with yet another feature of the invention, plugs for two coupling locations can advantageously also be constructed as short-circuit plugs. The top pins located on the plug are then optically short-circuited.

In accordance with yet a further feature of the invention, the rear portion of the outer walls is advantageously machined so as to form a profiled grip portion. Suitable profiles include, among others, transversely extending grooves, bumps, or roughened surfaces. At the same time, this portion may be provided with stop surfaces, which prevent overexpansion and overload on the partition or connecting wall when the front insertion regions spread apart.

In accordance with a concomitant feature of the invention, the outer walls are suitably constructed to have terminally extending crossbars, for instance, which are defined by stop surfaces. The spacing of these stop surfaces determines the maximum spreading angle.

In accordance with a preferred embodiment, the outer walls are formed by side plates facing one another approximately parallel. These elements may also have ribs on the outside and inside for reinforcing the side plates. The ribs at the same time take on the task of guiding the plug in an associated coupling location and additionally align the plug. In one embodiment, the side plates are pierced, so that they each cover only one coupling location. In other embodiments, the outer walls are shaped as half shells, so that they completely sheath the coupling location. The mobility of the outer walls relative to one another is unhindered by the half shells, which partly mesh with one another.

The plug according to the invention is especially advantageously suitable for fiber-optical wave guide connections and electrooptical modules, with or without an SC slot.

Other features which are considered as characteristic for the invention are set forth in the appended claims.

Although the invention is illustrated and described herein as constructed in a disconnectable plug, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
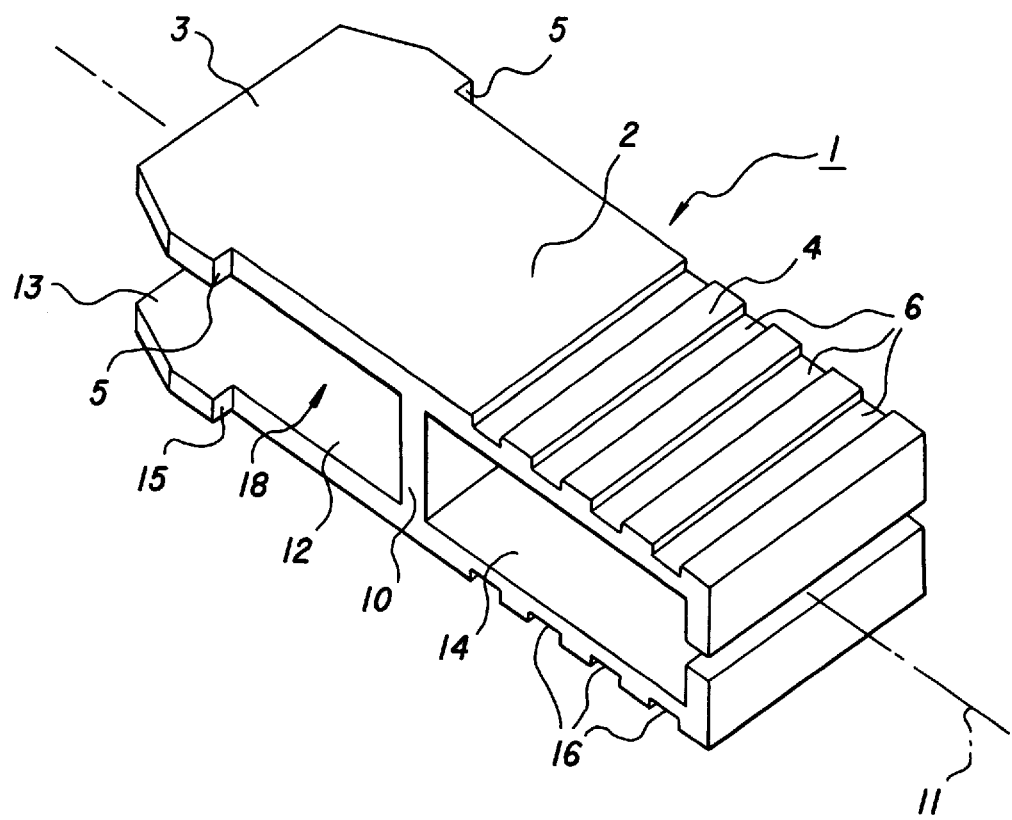
FIG. 1 is a diagrammatic, perspective view of a plug according to the invention.

Referring now to the figures of the drawings in detail and first, particularly, to FIG. 1 thereof, there is seen a disconnectable plug 1 which is formed by two outer walls 2, 12. Each outer wall 2, 12 has a front insertion region 3, 13 and a rear grip region 4, 14, respectively. The insertion regions 3, 13 and the grip regions 4, 14 face one another, and in particular a receiving chamber 18 for a non-illustrated plug element is defined by the insertion regions 3, 13 of the outer walls 2, 12. The outer walls 2, 12 are approximately parallel to one another. In their middle region, the outer walls 2, 12 are resiliently joined together by a partition 10. The partition 10 extends over the entire width of the outer walls and is aligned crosswise to a perspective axis 11 of the plug. The insertion region 3, 13 of each of the outer walls 2, 12 is constructed as a trapezoid and protrudes beyond the width of the outer walls 2, 12. Due to this lateral oversize, detent surfaces 5, 15 are formed, which are perpendicular to the perspective axis 11. The rear grip region or portion 4, 14 of each of the outer walls 2, 12 is machined so as to form a profiled grip portion. The profile is formed by grooves 6, 16 located transversely to the perspective axis 11 of the plug connection.

Figure 2:
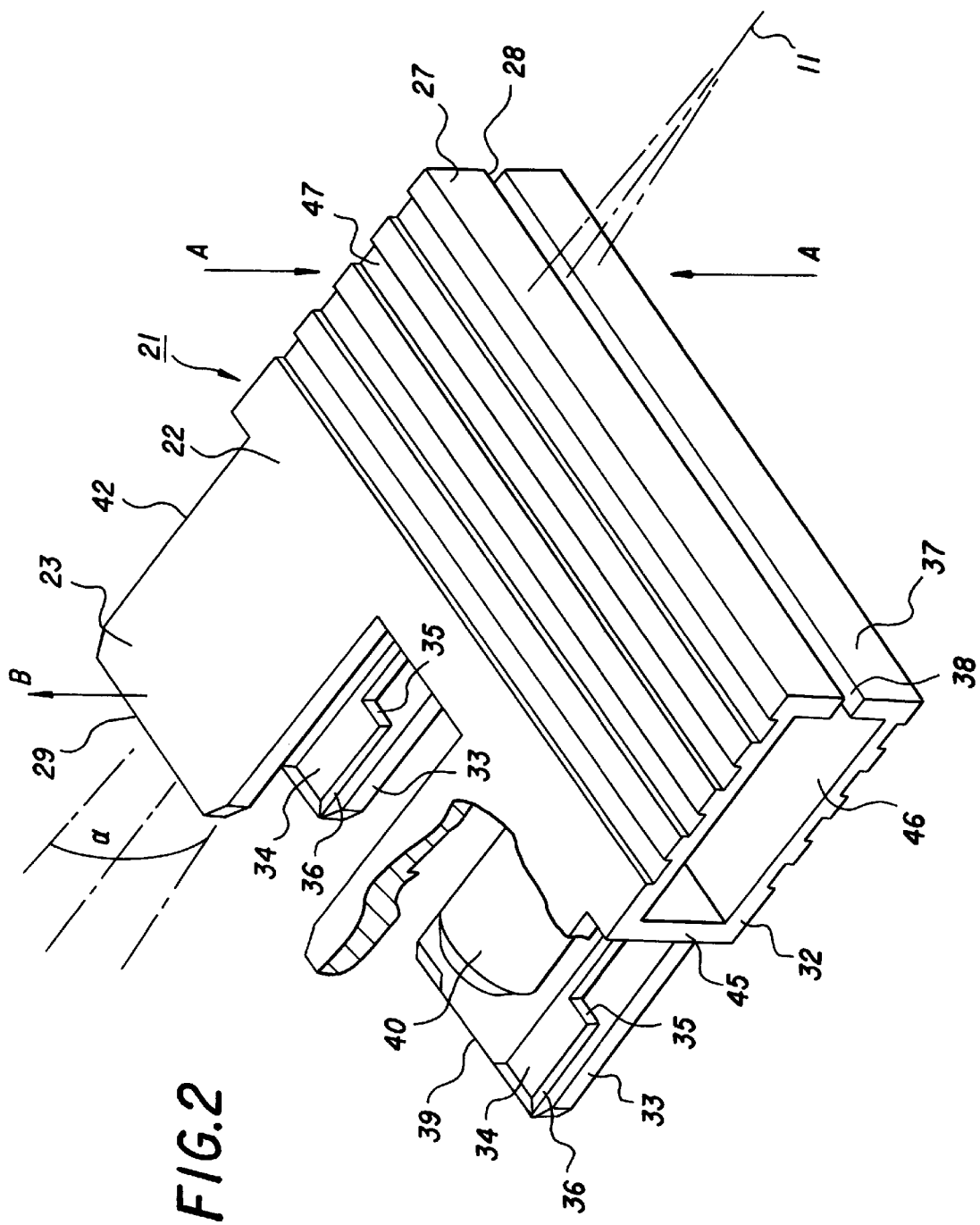
FIG. 2 is a partly broken-away, perspective view of a plug for two coupling locations side by side.

A plug connection 21 for two side-by-side coupling locations is shown in FIG. 2. Outer walls 22, 32 can again be broken down into an insertion region and a grip region. The insertion region of the outer walls 22, 32 is formed of two side-by-side, approximately rectangular side plates 23, 33, having a front edge 29, 39 which is blunted slightly at the side. Opposed inner surfaces of the side plates 23, 33 have locking bearings 34 thereon in the form of structured protuberances. The locking bearings 34 are defined on one side by stop surfaces 36 aligned parallel to the perspective axis 11, and detent surfaces 35 that are perpendicular to the perspective axis 11. End surfaces of the locking bearings 34 abut the front edges 29, 39 of the side plates 23, 33. Transversely extending struts or terminal crossbars 27, 37 with stop surfaces 28, 38 are provided on the ends of the outer walls 22, 32 to limit play in motion of the side plates 23, 33.

In the broken-away view of FIG. 2, a sealing element 40 for a fiber-optical wave guide module can be seen. The sealing element 40 serves to guard a fiber-optical wave guide receiving bush. Instead of the sealing element 40, a plug pin 42 (which is concealed in the drawing) that carries a fiber-optical wave guide, may also be mounted on a connecting wall 45. In that case, the plug serves to couple a fiber-optical wave guide to an electrooptical module or to some other fiber-optical wave guide.

When the plug is inserted into a suitable receiving device, such as a fiber-optical wave guide coupling, pressure A on the grip region 46, 47 of the outer walls 22, 32 spreads apart the front side plates 23, 33 as indicated by an arrow B. A maximum spreading angle a is determined by the spacing of the stop surfaces 28, 38 from one another. As a result of the spreading B of the side plates 23, 33, detent arms of the receiving device can be put in place between the side plates 23, 33. The plug is thus introduced into the receiving device until detent surfaces of the detent arms on the receptacle are in alignment with the detent surfaces 35 of the side surfaces 23, 33. As a result of a spring force brought to bear by the connecting wall 45, the detent surfaces are led past one another until they interact with one another and then interlockingly face one another. As a rule, the locking is effected by snapping together of the front side plates 23, 33 as soon as the detent surfaces are in alignment with one another. A low detent spring tension, which presses the front side plates 23, 33 slightly against the detent arms of the coupling, is advantageous. This prevents unintended undoing of the locking. The residual spring tension can be attained, for instance, through the use of somewhat overly widely constructed detent arms or, in the untensed state of repose of the plug, by having the front side plates 23, 33 point slightly toward one another.

A suitable contact pressure of the detent surfaces on the module against the detent surfaces on the plug is generated, for instance, by pressing the sealing element 40 against a receiving bush. The plug connection is thus securely established and accurately locked.

The front side plates 23, 33 are spread apart as shown by reference symbol B due to the pressure A on the griplike rear portion 46, 47 of the outer walls 22, 32 for unlocking the plug. As a result, the detent surfaces 35 of the side plates 23, 33 are moved out of an interaction region of the detent surfaces of the detent arms, until the mutual locking has been undone. The plug can then be pulled out of the receiving device.

Figure 3:
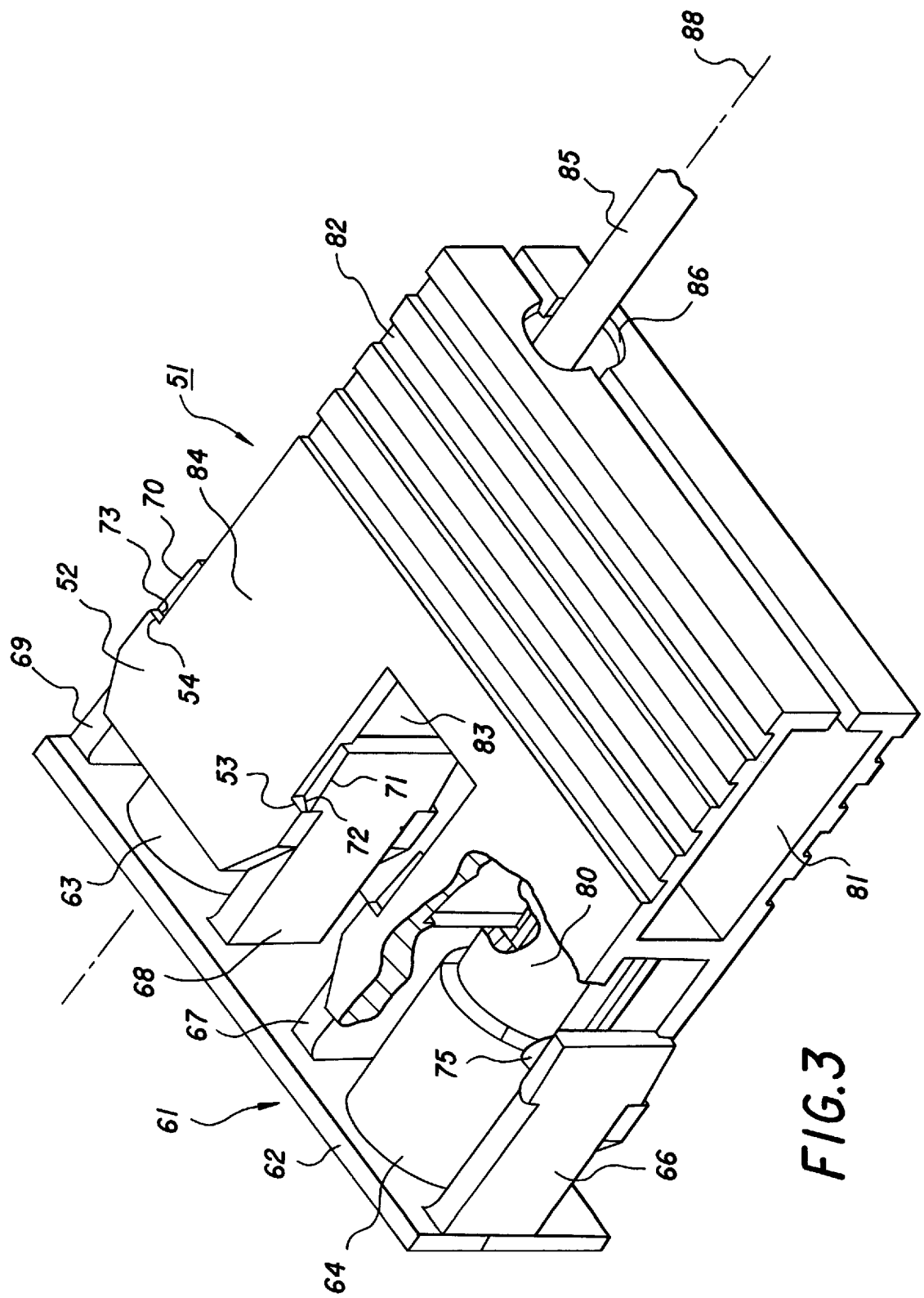
FIG. 3 is a partly broken-away, perspective view of a disconnectable plug locked in detent fashion into a module.

FIG. 3 shows a plug 51 connected to an electrooptical module or plug partner 61. In order to merely illustrate advantageous functions, the plug 51 has a sealing stopper 80 on the left and a fiber-optical wave guide 85 on the right which are connected to the module or counterpart plug partner 61. The module 61, which is represented in this case merely by a base plate 62, carries plug elements in the form of bushes 63, 64 that are laterally surrounded by detent arms 66, 67, 68, 69 having an interaction region. The detent arms 68, 69 widen in their forward portion and thus form detent surfaces 72, 73. The detent surfaces 72, 73 are braced against receiving surfaces 53, 54 of the plug 51, thereby fixing the plug 51 to the electrooptical module 61. Both the sealing stopper 80 in the receiving bush 64 and the fiber-optical wave guide 85 in the bush 63 are thus aligned and fixed. In order to avert pinching of the fiber-optical wave guide 85 when pressure is exerted in a grip region 81, 82 of the plug 51, an opening 86 has been provided on the end.

The alignment and retention of the plug 51 in the module 61 is attained through the use of the mutual locking of the receiving surfaces 53, 54 and the detent surfaces 72, 73, respectively. Widened portions 70, 71 of the detent arms 68, 69 additionally serve the purpose of lateral alignment of the plug 51 in the module 61. Since the locking is effective at four surfaces (two per detent arm), the plug 51 of the invention is distinguished by a high load-bearing capacity and better alignment than conventional known plug connections, which are based on a two-surface locking, for instance, of a locking latch 75. The four-surface locking is lent its stability by the two detent surfaces 72, 73 located on each of the lateral widened portions 70, 71 of the detent arms 68, 69. Due to the special shaping of the plug 51, each outer wall 83, 84 cooperates with both detent arms 68, 69. The four surfaces 53, 54 (the others are not shown) are located at a maximum distance from a bush axis 88. As a result, a stronger lever action for fixation of the plug 51 is advantageously attained.

The plug 51 may have a sealing stopper 80 or fiber-optical wave guides 85 on both sides. If the plug 51 acts as a short-circuit plug, then fiber-optical plug pins on the left and right sides are optically short-circuited with one another. This makes it possible for module inspection to be carried out in the inserted state.

We claim:

1. A disconnectable plug, comprising:
   two spaced-apart and approximately mutually parallel aligned outer walls;
   said outer walls defining a housing having a receptacle chamber for receiving a plug element and a plug element insertion direction;
   said outer walls having a front insertion region with detent surfaces projecting transversely to said plug element insertion direction for locking corresponding detent arms of a plug partner having an interaction region;
   said outer walls having a middle region resiliently joining said outer walls together for interacting said detent surfaces with the detent arms of the plug partner in an inserted, locked state of the plug; and
   said insertion regions resiliently spreading apart for transferring the plug into an unlocking position with said detent surfaces removed from the interaction region of the detent arms of the plug partner.

2. The disconnectable plug according to claim 1, wherein said detent surfaces of each of said outer wall cooperate lockingly with both detent arms of the plug partner.

3. The disconnectable plug according to claim 1, including a partition joined to said outer walls for resiliently supporting said two outer walls relative to one another.

4. The disconnectable plug according to claim 3, wherein said outer walls and said partition are made in one piece of a solid, elastic plastic.

5. The disconnectable plug according to claim 3, wherein at least one plug partner is carried by said partition and constructed as sealing elements.

6. The disconnectable plug according to claim 3, wherein at least one plug partner is carried by said partition and constructed as fiber-optical plug pins.

7. The disconnectable plug according to claim 1, including two fiber-optical plug pins disposed and optically short-circuited in the plug.

8. The disconnectable plug according to claim 1, wherein said outer walls have rear regions machined to form a profiled grip portion.

9. The disconnectable plug according to claim 1, wherein said outer walls have terminal crossbars with stop surfaces for limiting play during motion of said outer walls relative to one another.

* * * * *